United States Patent
Major et al.

(10) Patent No.: US 9,102,225 B2
(45) Date of Patent: Aug. 11, 2015

(54) AIR CONDITIONING FOR BELT-ALTERNATOR-STARTER HYBRID ELECTRIC VEHICLE

(75) Inventors: Gregory A. Major, Farmington Hills, MI (US); Todd M. Tumas, Taylor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2347 days.

(21) Appl. No.: 11/930,342

(22) Filed: Oct. 31, 2007

(65) Prior Publication Data

US 2009/0107739 A1  Apr. 30, 2009

(51) Int. Cl.
*B60K 6/485* (2007.10)
*B60W 10/06* (2006.01)
*B60W 10/08* (2006.01)
*B60W 10/30* (2006.01)
*B60W 20/00* (2006.01)

(52) U.S. Cl.
CPC .............. *B60K 6/485* (2013.01); *B60W 10/06* (2013.01); *B60W 10/08* (2013.01); *B60W 10/30* (2013.01); *B60W 20/00* (2013.01); *Y02T 10/6226* (2013.01); *Y02T 10/6286* (2013.01)

(58) Field of Classification Search
USPC ............... 180/65.2, 65.265, 65.275, 65.28, 180/65.285, 65.31; 62/134, 228.5, 236, 62/323.3, 323.4
See application file for complete search history.

(56) References Cited

U.S. PATENT DOCUMENTS

| | | | |
|---|---|---|---|
| 6,675,596 B2 * | 1/2004 | Iwanami et al. | 62/236 |
| 6,729,998 B2 * | 5/2004 | Egami | 477/3 |
| 6,755,033 B2 * | 6/2004 | Iwanami et al. | 62/133 |
| 2004/0116227 A1 * | 6/2004 | Fujioka et al. | 475/5 |
| 2007/0187953 A1 * | 8/2007 | Park | 290/28 |

FOREIGN PATENT DOCUMENTS

| | | |
|---|---|---|
| CN | 2554567 Y | 6/2003 |
| EP | 0916546 A2 | 5/1999 |
| EP | 1249360 A1 | 10/2002 |

* cited by examiner

*Primary Examiner* — Katy M Ebner

(57) ABSTRACT

A hybrid electric vehicle having an air conditioning system, an engine and a belt-alternator-starter motor-generator, and a method of operation, is disclosed. A torque transfer assembly, such as a pulley and belt assembly, engages the engine and motor-generator, and includes a clutched member for selectively disconnecting the torque transfer between the engine and motor-generator. A refrigerant compressor includes a compressor shaft rotationally coupled to and driven by the motor-generator shaft. The compressor may be driven by the motor-generator when the engine is not operating.

1 Claim, 1 Drawing Sheet

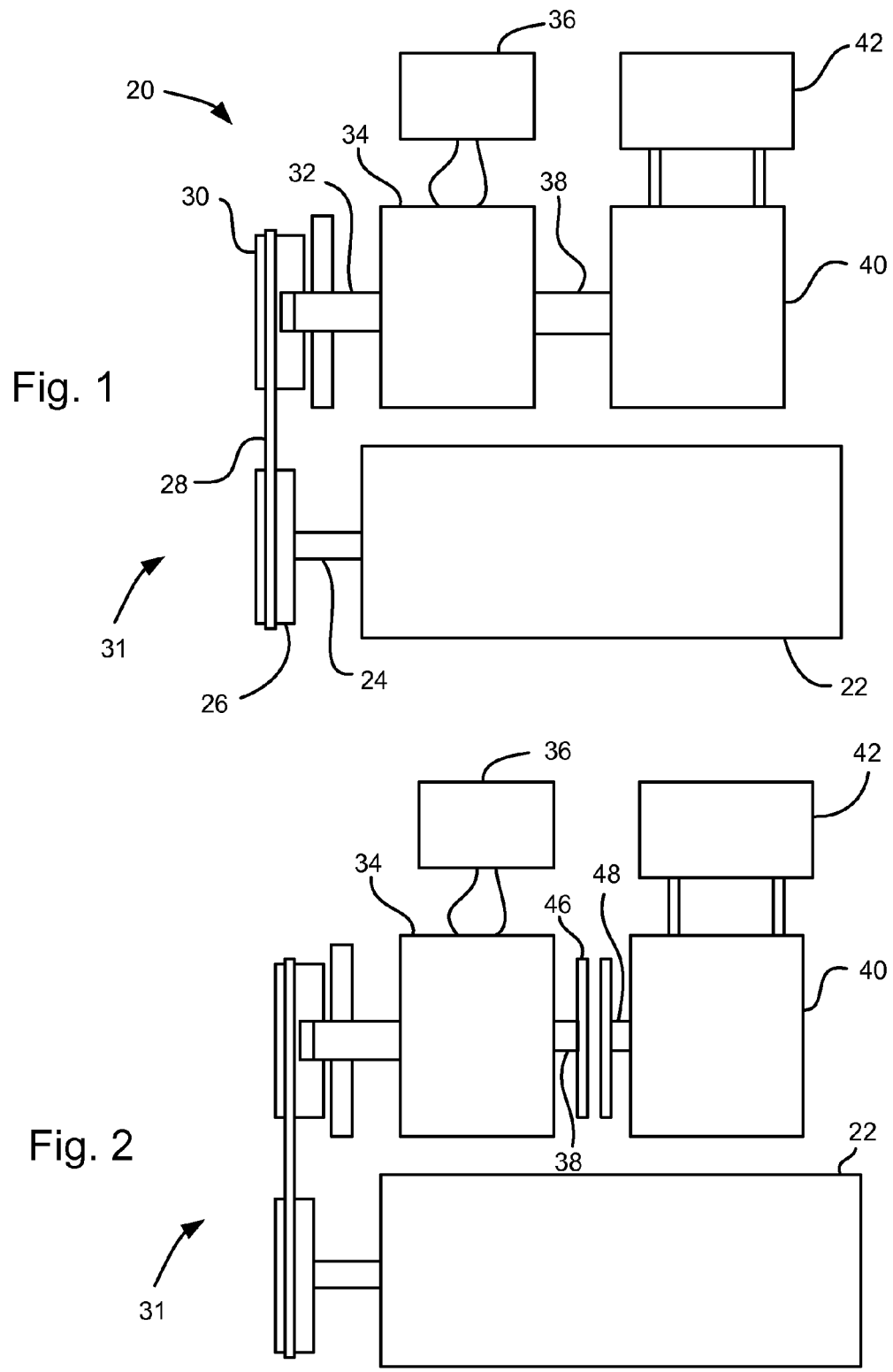

AIR CONDITIONING FOR BELT-ALTERNATOR-STARTER HYBRID ELECTRIC VEHICLE

BACKGROUND OF INVENTION

The present invention relates generally to hybrid electric vehicles, and more particularly air conditioning for belt-alternator-starter hybrid electric vehicles.

Some types of hybrid vehicles do not have the capability to provide air conditioning comfort when the vehicle engine is off. To improve the overall fuel economy of the vehicles, however, it is generally preferable to have the engine off as often as possible. Nonetheless, not having continuous air conditioning capability may be unsatisfactory to vehicle occupants as compared to conventional vehicles where the engine runs all of the time, allowing for air conditioning whenever desired.

In order to alleviate this concern, some have proposed systems for hybrid vehicles that provide air conditioning even when the engine is off. For example, some hybrid vehicles include refrigerant compressors that have their own electric motor to drive them. Then, the compressor is driven independently of the engine. Others take this one step further by not only having a separate motor to drive the refrigerant compressor, but also allowing for dual drive where the compressor is driven directly off of the accessory drive belt. However, both of these solutions adds to the weight and cost of the vehicle due to the addition of the extra compressor motor as well as the electronics and cables to operate the motor. Still others have attempted to alleviate this concern by providing thermal storage systems that allow for air conditioning comfort during engine off vehicle operation. But these thermal storage systems still add significant cost and require additional packaging space for the air conditioning system, and some only provide the air conditioning comfort for limited amounts of time before the engine must be restarted.

SUMMARY OF INVENTION

An embodiment contemplates a hybrid electric vehicle having an air conditioning system. The hybrid electric vehicle may comprise an engine having an engine shaft; a motor-generator having a motor-generator drive shaft; a torque transfer assembly operatively engaging the engine shaft and the motor-generator drive shaft for transferring torque therebetween, with the torque transfer assembly including a clutched member for selectively disconnecting the torque transfer between the engine shaft and the motor-generator drive shaft; and a refrigerant compressor including a compressor shaft rotationally coupled to and driven by the motor-generator shaft.

An embodiment contemplates a motor-generator and a refrigerant compressor assembly for use in a hybrid electric vehicle. The motor-generator may have a motor-generator drive shaft, and an electronically controlled, clutched pulley mounted to the motor-generator drive shaft. The clutched pulley transfers torque through a torque transfer assembly to an engine. The refrigerant compressor may include a compressor shaft rotationally coupled to and driven by the motor-generator drive shaft.

An embodiment contemplates a method of operating a refrigerant compressor in a hybrid electric vehicle employing a belt-alternator-starter motor-generator, the method comprising the steps of: operating the motor-generator in a starter mode to apply a torque to an engine shaft during engine startup; operating the motor-generator in an alternator mode to receive a torque from the engine and charge a battery; and transferring torque from the motor-generator to the refrigerant compressor to operate the refrigerant compressor.

An advantage of an embodiment is an ability to provide air conditioning comfort during engine off operation of a hybrid electric vehicle, while minimizing the additional weight and cost.

BRIEF DESCRIPTION OF DRAWINGS

FIG. 1 is a schematic diagram of systems employed in a hybrid electric vehicle.

FIG. 2 is a view similar to FIG. 1, but illustrating a second embodiment.

DETAILED DESCRIPTION

Referring to FIG. 1, a portion of a hybrid electric vehicle, indicated generally at 20, is shown. The hybrid electric vehicle 20 illustrated is a belt-alternator-starter type. The hybrid electric vehicle 20 includes an engine 22, which may be a conventional internal combustion engine. An engine shaft 24, such as, for example, a crankshaft, extends from the engine 22. An accessory drive pulley 26 is mounted to the engine shaft 24. A belt 28 is secured around the accessory drive pulley 26 and is also secured around an electronically controlled clutched pulley 30. Together, the accessory drive pulley 26, belt 28 and clutched pulley 30 define an engine driven torque transfer assembly 31. While a pulley and belt mechanism is illustrated for the torque transfer assembly 31, other mechanisms, such as, for example, a sprocket and chain assembly, or other similar torque transfer mechanism may be employed instead if so desired.

The clutched pulley 30 is supported by a motor-generator drive shaft 32 and is electronically controlled so that it is selectively rotationally coupled to the motor-generator drive shaft 32. The motor-generator drive shaft 32 extends from and drives (and is driven by) a belt-alternator-starter motor-generator 34. The motor-generator 34 is electrically connected to a battery/vehicle electronics assembly 36. The battery/vehicle electronics assembly 36 may be essentially conventional and so will not be discussed in any more detail herein.

A compressor drive shaft 38, which is rotationally fixed to the motor-generator drive shaft 32 (or may be the same shaft), engages and drives a refrigerant compressor 40. The compressor 40 may be a conventional electronically controlled, variable capacity refrigerant compressor. The compressor 40 may engage other air conditioning system components 42 in a conventional fashion. Since the air conditioning system components 42 may be conventional, they will not be shown or discussed in more detail herein.

The operation of the systems shown in FIG. 1 will now be discussed. To start the engine 22, the clutched pulley 30 is engaged and power is supplied from the battery 36 to the motor-generator 34. The motor-generator 34, then, acts like a conventional starter and drives the engine 22 through the belt 28 and accessory drive pulley 26 until the engine 22 is operational.

With the engine 22 operating, the accessory drive pulley 26 and belt 28 drive the clutched pulley 30, which, in turn, drives the motor-generator drive shaft 32. Since the motor-generator drive shaft 32 is rotationally fixed relative to the compressor drive shaft 38, both the motor-generator 34 and the compressor 40 are driven. The motor-generator 32 acts like a conventional alternator, charging the battery 36. The compressor 40 acts like a conventional variable capacity compressor. When no air conditioning is requested by vehicle occupants, the capacity will be reduced to a minimum level in order to minimize the energy used by the compressor 40. When air conditioning is requested, the capacity of the compressor 40 is increased to the level needed to meet the demand. Accordingly, the belt 28 and clutched pulley 30 are sized to accommodate the combined torques of the motor-generator 34 and the refrigerant compressor 40.

If the vehicle 20 is operating with the engine 22 off and air conditioning is requested (with sufficient battery charge), then the clutched pulley 30 is disengaged to allow the motor-generator drive shaft 32 to rotate relative to the accessory drive belt 28. Also, the motor-generator 34 is driven by the battery/vehicle electronics assembly 36, which, in turn, drives the compressor 40 via the compressor drive shaft 38. Thus, even with the engine 22 off, air conditioning can be provided to vehicle occupants. Accordingly, the motor-generator 34 is sized to be able to provide the torque necessary for steady state compressor loads with the compressor 40 operating in a high capacity mode. Should the battery charge run low, then the engine 22 can be restarted and the clutched pulley 30 re-engaged in order to provide torque to the refrigerant compressor 40 via the motor-generator 34.

As an alternative, there may be a gear set between the motor-generator 34 and the compressor 40 to assure that there is not a speed mismatch between the two.

FIG. 2 illustrates a second embodiment. Since this embodiment is similar to the first, similar element numbers will be used for similar elements. The engine 22, torque transfer assembly 31, belt-alternator-starter motor-generator 34, battery/vehicle electronics assembly 36, and air conditioning system components 42 may be the same as in the first embodiment.

In this embodiment, the compressor drive shaft 38 does not directly connect to the refrigerant compressor 40. Instead, an electronically controlled compressor clutch 46 selectively controls the torque transfer between the compressor drive shaft 38 and a compressor driven shaft 48. With the refrigerant compressor 40 being able to decouple from the motor-generator 34, the compressor 40 may be a fixed displacement compressor. Although, one may employ a variable capacity compressor, if so desired. Thus, for a fixed displacement compressor, the compressor clutch 46 may be cycled to, in effect, vary the capacity; for a variable capacity compressor, the capacity of the compressor itself may be varied; and, for either type of compressor, the capacity may be varied by controlling the speed of the motor-generator 34.

The operation is similar to the first embodiment, but with added flexibility in determining when torque is transferred to the compressor 40. That is, when no air conditioning is needed, the compressor clutch 46 remains disengaged, allowing the motor-generator to rotate independently of the compressor 40. This may reduce parasitic spin loss and reduce rotational inertia associated with the compressor 40 when air conditioning is not needed. Of course, the additional weight of the compressor clutch 46 is incurred in this embodiment as compared to the first.

While certain embodiments of the present invention have been described in detail, those familiar with the art to which this invention relates will recognize various alternative designs and embodiments for practicing the invention as defined by the following claims.

What is claimed is:

1. A method of operating a refrigerant compressor in a hybrid electric vehicle employing a belt-alternator-starter motor-generator, the method comprising the steps of:
   (a) providing a motor-generator shaft in the motor-generator with a direct connection to an electronically controlled, clutched pulley, an accessory drive pulley mounted on an engine shaft of an engine, and an accessory drive belt mounted around the accessory drive pulley and the clutched pulley for transferring torque therebetween;
   (b) operating the motor-generator in a starter mode to apply a torque to the motor-generator shaft, through the clutched pulley, through the belt and to the engine shaft during engine startup;
   (c) operating the motor-generator in an alternator mode to receive the torque from the engine and charge a battery;
   (d) electronically disengaging the clutched pulley and proving electric power to the motor-generator to transfer torque from the motor-generator to the refrigerant compressor to operate the refrigerant compressor;
   (e) varying a capacity of the refrigerant compressor based on vehicle air conditioning requirements; and
   (f) selectively decoupling the torque transfer from the motor-generator to the refrigerant compressor by disengaging a compressor clutch, having a first portion directly connected to the motor-generator shaft and a section portion directly connected to a driven shaft extending from the compressor, when air conditioning is not requested.

* * * * *